US005526048A

United States Patent [19]

Yamamoto

[11] Patent Number: 5,526,048

[45] Date of Patent: Jun. 11, 1996

[54] WHITE BALANCE ADJUSTING DEVICE FOR AN ELECTRONIC STILL CAMERA

[75] Inventor: Yasuhiro Yamamoto, Itabashi-ku, Japan

[73] Assignee: Asahi Kogaku Kogyo Kabushiki Kaisha, Tokyo, Japan

[21] Appl. No.: 401,119

[22] Filed: Mar. 9, 1995

[30] Foreign Application Priority Data

Mar. 11, 1994 [JP] Japan .................................... 6-067682

[51] Int. Cl.[6] ........................................................ H04N 9/73

[52] U.S. Cl. .......................... 348/223; 348/227; 348/265; 348/270; 348/280; 348/282; 358/909.1

[58] Field of Search .................................... 348/223, 224, 348/227, 226, 230, 265, 655, 270, 273, 280, 281, 282; 358/29 C, 29, 42, 44, 50, 909.1; H04N 9/73, 9/73 C, 9/083, 9.04

[56] References Cited

U.S. PATENT DOCUMENTS 5,065,232 11/1991 Kondo .................................... 348/224
5,111,299 5/1992 Aoki et al. .
5,132,825 7/1992 Miyadera .
5,155,635 10/1992 Kakiuchi .
5,239,368 8/1993 Suzuki .................................... 348/226

*Primary Examiner*—James J. Groody
*Assistant Examiner*—Sherrie Hsia
*Attorney, Agent, or Firm*—Greenblum & Bernstein

[57] ABSTRACT

A white balance adjusting device includes a dichroic prism for dividing light reflected from an object into a green-component, a red-component and a blue-component. These primary color components are incident on a first CCD, a second CCD and a third CCD. Based on photometry data from a photometry sensor, an electronic charge accumulating period for the first CCD corresponding to the green-component is determined. Based on a colorimetry by a colorimetry sensor, electronic charge accumulating periods for the second CCD corresponding to the red-component and the third CCD corresponding to the blue-component are determined. When the color temperature is high, the electric charge accumulating period for the second CCD is set to be relatively long, and the electric charge accumulating period for the third CCD is set to be relatively short.

12 Claims, 10 Drawing Sheets

(PHASE 1)

(PHASE 2)

(PHASE 3)

(PHASE 4)

(PHASE 5)

(PHASE 6)

WHITE BALANCE ADJUSTING DEVICE FOR AN ELECTRONIC STILL CAMERA

BACKGROUND OF THE INVENTION

1. Field of the Invention

The present invention relates to a white balance adjusting device provided in an electronic still video camera.

2. Description of the Related Art

In a conventional electronic still video camera, a white balance adjustment is performed so that a white light reflected from an object is photographed as white, regardless of color temperature of the light incident onto the object. For carrying out the white balance adjustment, amplifiers are provided in a process circuit to amplify a blue (B)-signal and a red (R)-signal. For example, when the color temperature of the reflected light is high, amplifier gain of the B-signal is set to a low value, so that sensitivity to blue light is lowered, and thus, the object image is prevented from being tinged with blue.

In the white balance adjustment in the process circuit, however, an image signal outputted from an imaging device easily deteriorates, since signal processing in the process circuit is analog. Therefore, in a conventional electronic still video camera, the white balance adjustment can not be carried out with high accuracy.

SUMMARY OF THE INVENTION

Therefore, an object of the present invention is to provide a white balance adjusting device in which a white balance adjustment is performed easily and with high accuracy.

According to the present invention, a white balance adjusting device is provided in an electronic still video camera, comprising a colorimetry sensor, generating means and a control circuit. The colorimetry sensor senses a color temperature of an object to be photographed by the electronic still video camera. The generating means generates image signals indicating the three primary colors of the light reflected from the object by accumulating electric charge in photodiodes, during respective accumulating periods. The control circuit controls the accumulating period for each of the three primary colors, based on the color temperature sensed by the colorimetry sensor. The accumulating periods during which electric charge is accumulated to generate each of the image signals are adjustable.

Further, the control circuit may start accumulating electric charge in the three imaging devices in sequence according to the length of the accumulating periods, and the control circuit stops all three accumulating operations in each imaging device simultaneously.

A dichroic prism may be provided for dividing light reflected from the object into three primary color components, and three imaging devices are disposed to face the dichroic prism. The electric charge accumulating periods for the three imaging devices are controlled in accordance with the color temperature sensed by the colorimetry sensor.

Optionally, a single imaging device may be provided, and a color filter having an R-filter element, a G-filter element and a B-filter element may be rotatably disposed in front of the imaging device so that each of the filter elements faces the imaging device in turn. When the three filter elements face the imaging device, the electric charge accumulating periods are controlled in accordance with the color temperature sensed by the colorimetry sensor.

BRIEF DESCRIPTION OF THE DRAWINGS

The present invention will be better understood from the description of the preferred embodiments of the invention, as set forth below, together with the accompanying drawings in which.

DESCRIPTION OF THE PREFERRED EMBODIMENTS

Figure 1:
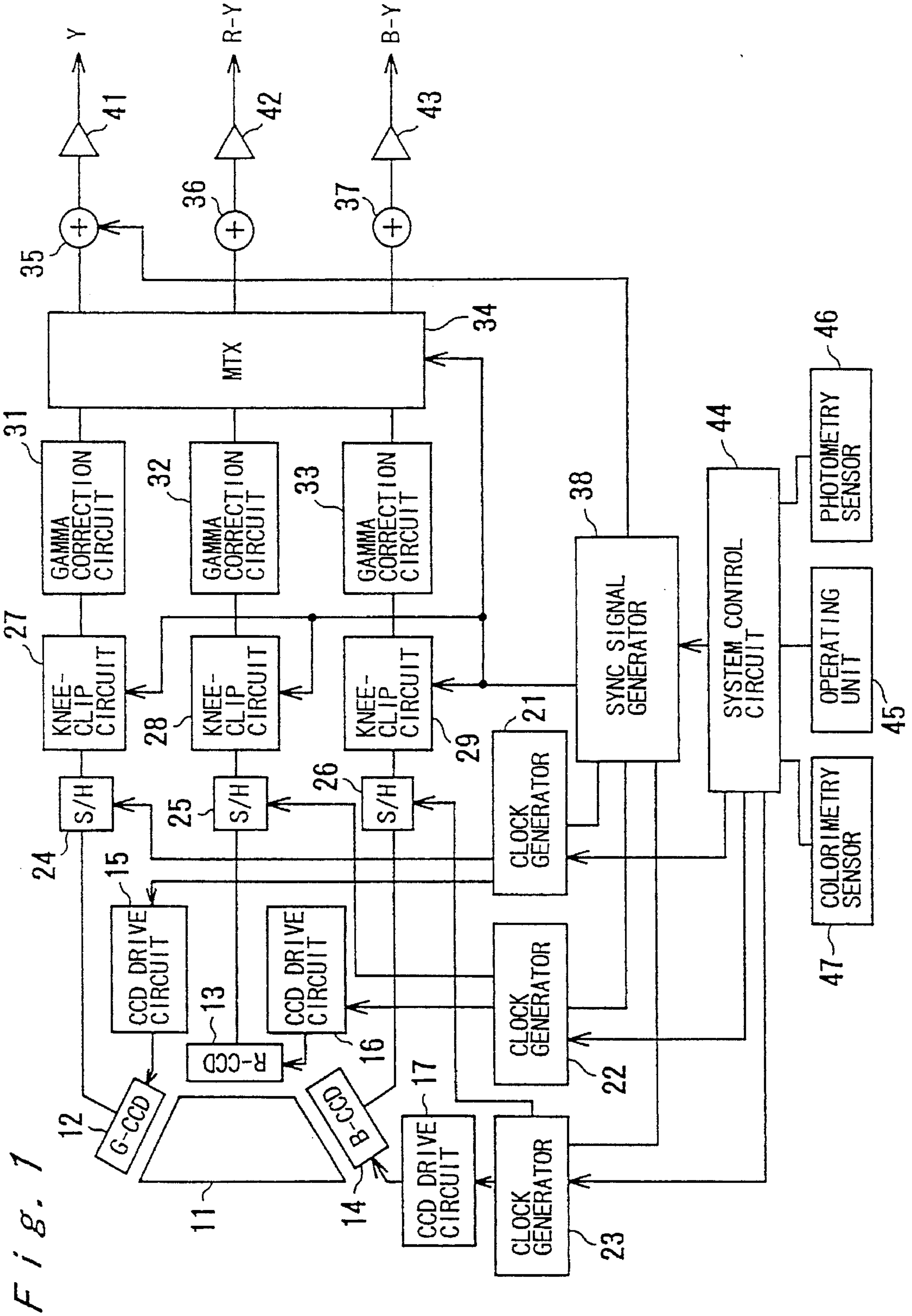
FIG. 1 is a block diagram of an electronic still video camera having a white balance adjusting device of a first embodiment of the present invention.

The present invention will now be described with reference to embodiments shown in the drawings.

FIG. 1 is a block diagram of an electronic still video camera having a white balance adjusting device of a first embodiment of the present invention.

Light reflected from an object passes through a photographing lens (not shown), and is divided by a dichroic prism 11 into three primary colors, i.e. a green (G)-component, a red (R)-component, and a blue (B)-component, which are sensed by a first, a second and a third imaging device (CCD) 12, 13 and 14. These CCDs 12, 13 and 14 are disposed at optically equivalent positions to each other; therefore, same-sized object images are formed on their light receiving surfaces from which the G-signal, the R-signal and the B-signal are outputted under control of CCD drive circuits 15, 16 and 17, respectively. The G-, R- and B-signals are inputted into sample and hold circuits 24, 25 and 26, respectively, and thus, at a predetermined time, the G-, R- and B- signals are held at constant levels. The operation of the CCD drive circuits 15, 16 and 17 and the sample and hold circuits 24, 25 and 26 are controlled in accordance with a clock signal outputted from clock generators 21, 22 and 23.

The G-, R- and B- signals outputted by the sample and hold circuits 24, 25 and 26 are subjected to knee-clip processing in knee-clip circuits 27, 28 and 29, and are then subjected to processes such as gamma correction in gamma correction circuits 31, 32 and 33. Then, the G-, R- and B-signal are subjected to a predetermined calculation process, so that the luminance signal (Y) and the differential color signals (R-Y, B-Y) are obtained and outputted to a matrix circuit 34. The knee-clip circuits 27, 28 and 29 and the matrix circuit 34 are operated in accordance with a clock signal outputted by a synchronizing signal generator 38. The luminance signal outputted from the matrix circuit 34 is added to a composite synchronizing signal outputted from the synchronizing signal generator 38 in an adder 35, and amplified by an amplifier 41. Similarly, the differential color signals outputted from the matrix circuit 34 are added to the composite synchronizing signals in adders 36 and 37, and amplified by amplifiers 42 and 43, respectively. Thus, the luminance signal and the differential color signals are converted to signals according to predetermined processing, and are outputted to a monitor device (not shown).

Operation of the synchronizing signal generator 38 is controlled by a system control circuit 44, and operation of the clock generators 21, 22 and 23 is controlled by the synchronizing signal generator 38 and the system control circuit 44. An operating unit 45, a photometry sensor 46 and a colorimetry sensor 47 are connected to the system control circuit 44. The operating unit 45 is provided with switches for operating this electronic still video camera.

When a shutter button, included in the operating unit 45, is partly pressed, photometry data are detected by the photometry sensor 46, and a ratio (B/G) of the B- and G-components and a ratio (R/G) of the R- and G-components are detected by the colorimetry sensor 47.

Figure 2:
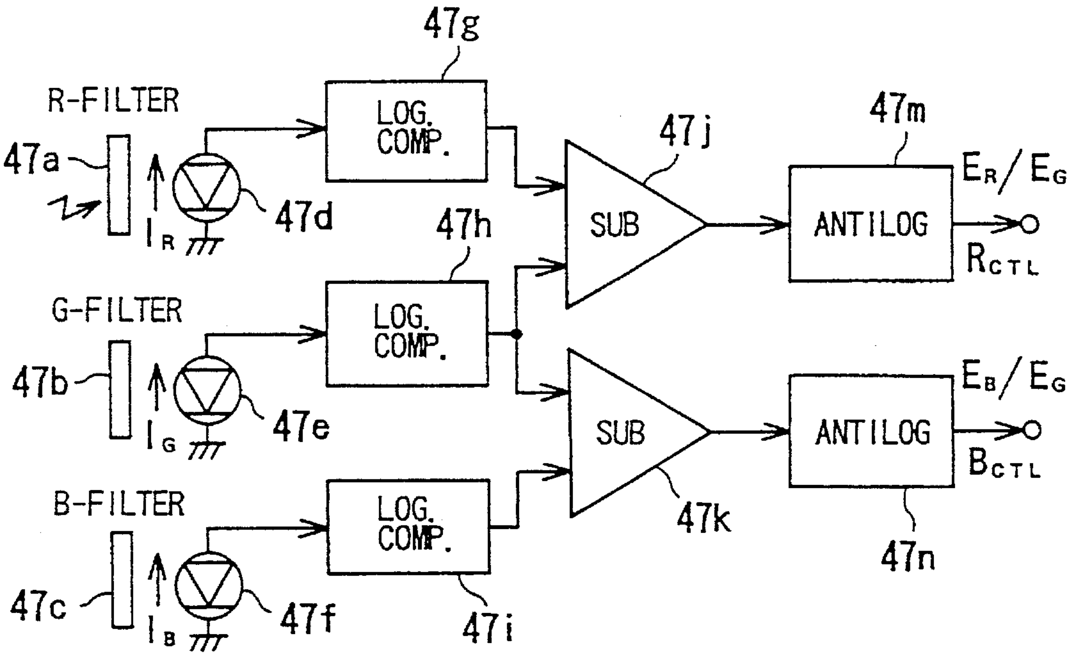
FIG. 2 is a block diagram showing a construction of a colorimetry sensor.

FIG. 2 shows an example of a construction of the colorimetry sensor 47. The R-, G- and B- components of light passing through R-, G- and B- filters **47*a*, 47*b* and 47*c* are sensed by photodiodes 47*d*, 47*e* and 47*f*, respectively. In the photodiodes 47*d*, 47*e* and 47*f*, electric current IR, IG and IB are generated, and the intensity of each current corresponds to the amount of light received in each of the photodiodes 47*d*, 47*e* and 47*f*. The current values are logarithmic-compressed by logarithmic compression circuits 47*g*, 47*h* and 47*i*, and are inputted into subtractors 47*j* and 47*k*. In subtractor 47*j*, the logarithmic value of the currents corresponding to the R- and the G-component are subtracted from each other, and the calculation result is antilog-converted in an antilog amplifier 47*m*. Namely, a signal (ER/EG) corresponding to R/G is outputted from the antilog amplifier 47*m*. Similarly, in the subtractor 47*k*, the logarithmic value of the currents corresponding to the B- and the G-component are subtracted from each other, and a signal (EB/EG) corresponding to B/G is outputted from an antilog amplifier 47*n***.

Figure 3:
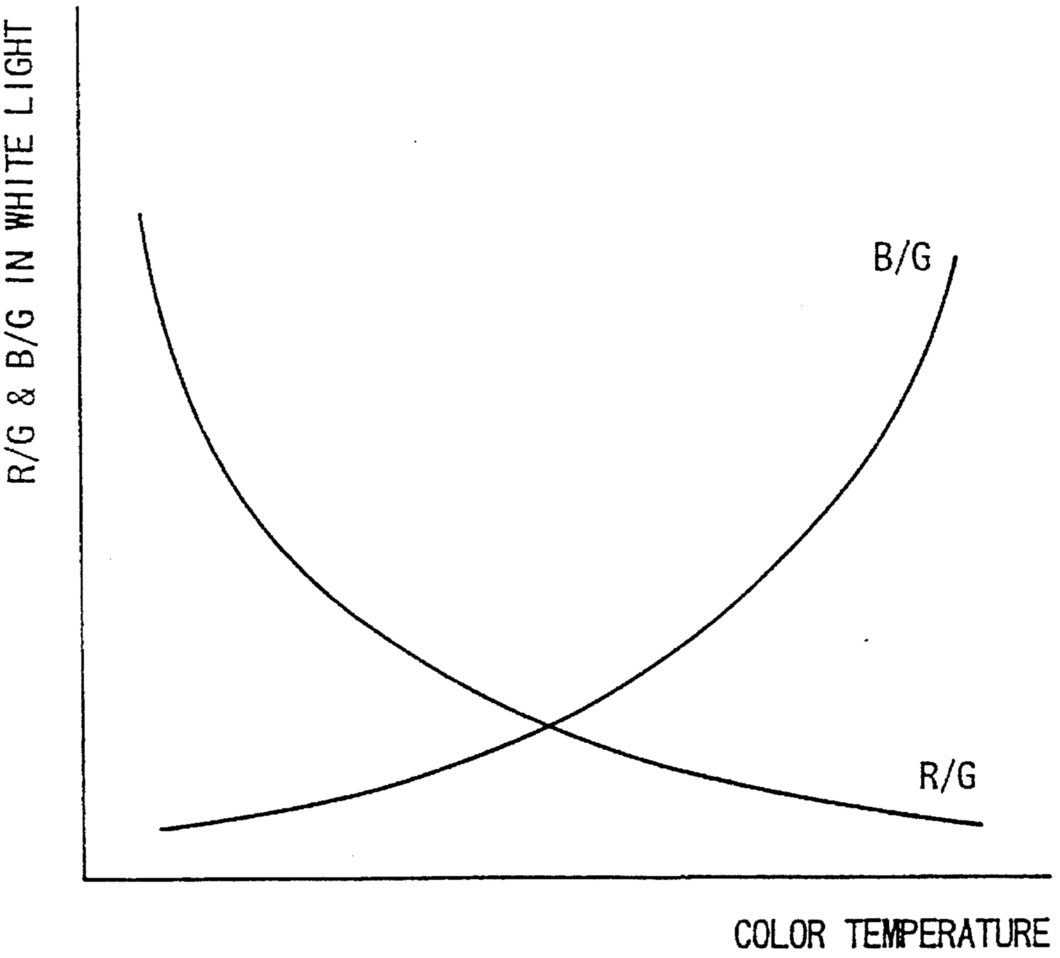
FIG. 3 is a diagram showing a relationship between a color temperature and the R/G and B/G ratios in white light.

FIG. 3 shows the relationship between color temperature and R/G and B/G ratios in white light. As may be understood from this drawing, the R/G ratio decreases as the color temperature rises, and the B/G ratio increases as the color temperature rises. As will be described later, a first ratio of accumulating periods in the second and first CCDs 13 and 12 and a second ratio of accumulating periods in the third and first CCDs 14 and 12 are changed in accordance with the color temperature, so that a white balance adjustment is performed.

Figure 4:
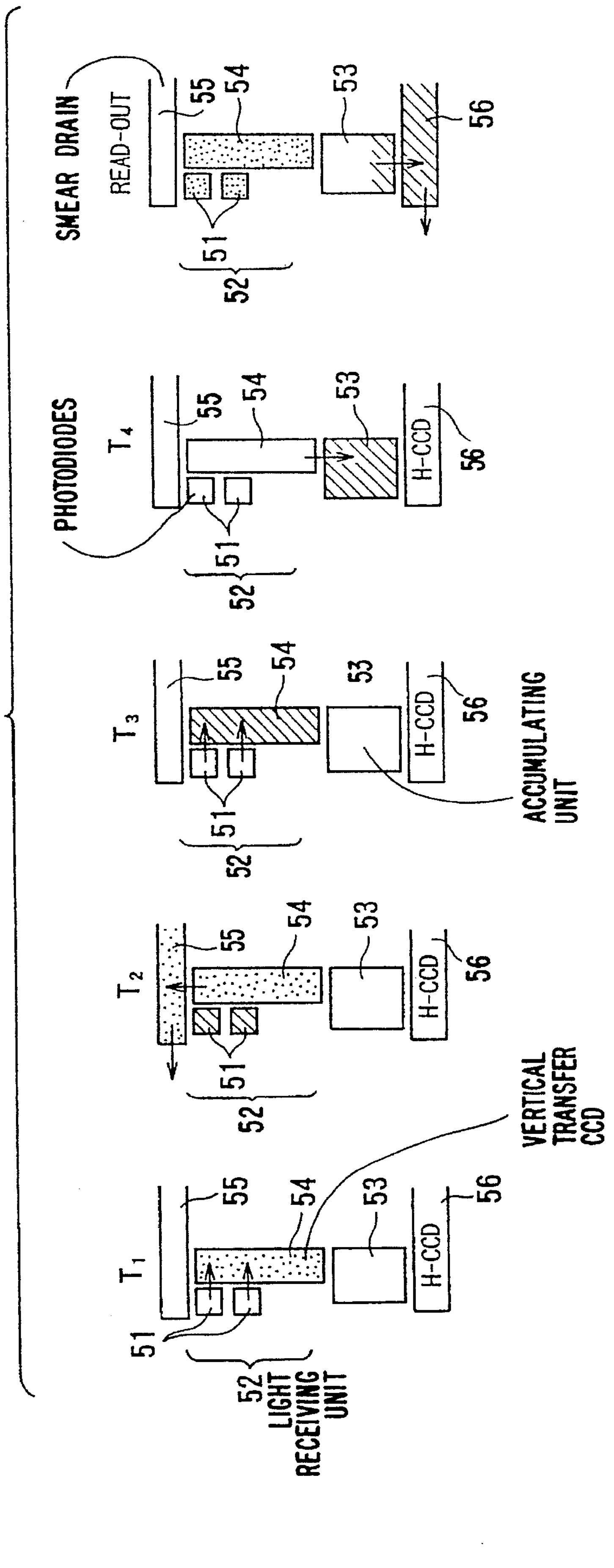
FIG. 4 is a diagram showing an operation in which a pixel signal is read from CCDs.

FIG. 4 shows the general construction of the CCDs 12, 13 and 14 and further shows an operation in which an image signal is read from them.

Each of the CCDs 12, 13 and 14 includes a light receiving unit 52 and an accumulating unit 53. The light receiving unit 52 has a plurality of photodiodes 51 which are aligned at a predetermined interval in a horizontal and in a vertical direction. In the light receiving unit 52, a vertical transfer CCD 54 is formed beside each vertical row of the photodiodes 51. One end of the vertical transfer CCD 54 is connected to a smear drain 55, and the other end of the vertical transfer CCD 54 is connected to the accumulating unit 53. The accumulating unit 53 has a capacity such that one field's worth of image signal generated in the light receiving unit 52 can be accumulated. A horizontal transfer CCD 56 may be provided in close proximity to the accumulating unit 53 and at the side of the light receiving unit 52 opposite from the smear drain CCD 55.

By accumulating electric charge generated in the photodiodes, the G-, R- and B-component signals are generated in the CCDs 12, 13 and 14, respectively.

At time T1, residual electric charge which has accumulated in the photodiodes 51 is transferred to the vertical transfer CCD 54, and thus, the photodiodes 51 become empty, so that accumulation of effective electric charge in the photodiodes 51 may be started.

At time T2, residual electric charge in the vertical transfer CCD 54 is transferred to the smear drain 55, and discharged outside through the smear drain 55. Note that, during this discharge operation, the effective electric charge is being accumulated in the photodiodes 51. The effective electric charge that has been accumulated in the photodiodes 51 is transferred from the photodiodes 51 to the vertical transfer CCD 54 at time T3. Thus, the accumulation of the effective electric charge in the photodiodes 51 is completed. Namely, the period between time T1 and time T3 corresponds to an electric shutter.

At time T4, a vertical transfer of the effective electric charge is started, so that the effective electric charge is transferred from the vertical transfer CCD 54 to the accumulating unit 53. During this vertical transfer operation, residual electric charge starts to be accumulated in the photodiodes 51 and the vertical transfer CCD 54. After one field's worth of image signal has been transferred to the accumulating unit 53, the signal is read out at a predetermined time. Namely, the effective electric charge is outputted externally from the accumulating unit 53 through the horizontal transfer CCD 56.

Figure 5:
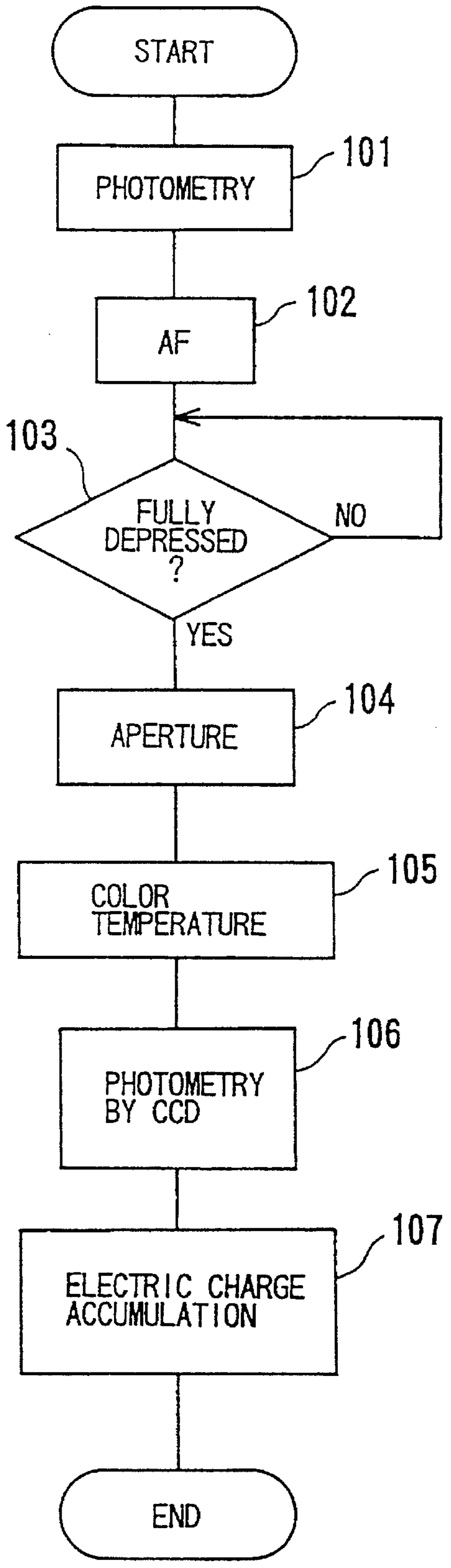
FIG. 5 is a flowchart of a program by which a still image is photographed by the electronic still video camera.

FIG. 5 is a flowchart of a program by which a still image is photographed by the electronic still video camera. The program is executed by the system control circuit 44, and started when a shutter button of the operating unit 45 is partly pressed.

In Step 101, a photometry measurement is carried out by the photometry sensor 46 while the aperture of the camera is fully open, and the electric shutter value and the aperture value are determined based on the photometry result. Note that the electric shutter value determined in Step 101 is only approximate, and the final value is determined in Step 106.

In Step 102, a distance measurement is performed based on an output signal of one of the CCDs 12, 13 and 14, and the position of the photographing lens is adjusted so that an in-focus condition is obtained.

Then, in Step 103, if it is determined that the shutter button has been fully depressed, the process goes to Step 104, where the aperture is operated so that the aperture is set to a state corresponding to the photometry result in Step 101. In Step 105, the color temperature is sensed based on the output signal of the colorimetry sensor 47, and the electric shutter speeds (corresponding to the electric charge accumulating periods) in the second and third CCDs 13 and 14 are determined based on the color temperature.

Thus, control of the electric charge accumulating periods in the second and third CCDs 13 and 14 works analogously to the gain control of amplifiers of R- and B-signals in a conventional electronic still video camera (i.e. it has the same effect as a white balance adjustment by amplifier gain control). Namely, lengthening the electric charge accumulating period has the same effect as increasing the gain of an amplifier in a conventional white balance adjustment device.

In Step 106, a photometry measurement is carried out based on the output signal of one of the CCDs 12, 13 and 14, so that the final value (time period) of the electric shutter is determined. In Step 107, electric charge is accumulated in accordance with the electric shutter, and thus, a still image signal is recorded.

Figure 6:
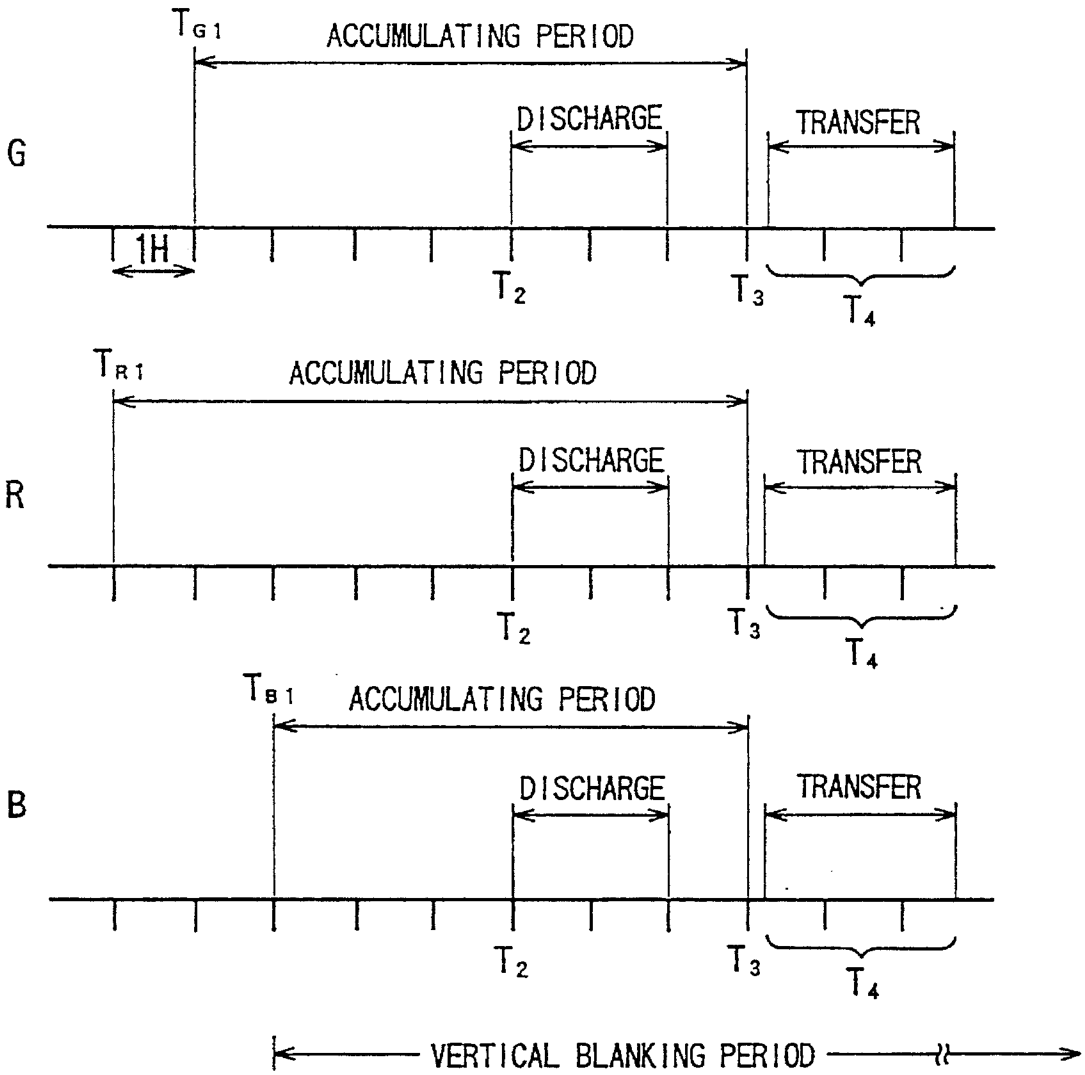
FIG. 6 is a diagram showing an example of timing of electric shutters of the CCDs.

FIG. 6 shows an example of the electric shutters of the CCDs 12, 13 and 14. With reference to FIG. 6, the operation in Steps 105 through 107 of FIG. 5 will be described. Note that FIG. 6 illustrates an example in which it is judged, based on the B/G and R/G ratios sensed by the colorimetry sensor 47 (Step 105), that the color temperature is relatively high (tinged with blue), and the electric charge accumulating period is controlled in such a manner that the period for the B-component is short while the period for the R-component is longer. Namely, the control shown in FIG. 6 obtains the same effect as an adjustment in which a gain for the B-component is lowered while a gain for the R-component is raised in a conventional device using amplifiers for the white balance adjustment.

In FIG. 6, the electric charge accumulating period of the first CCD 12 (for the G-component) is set based on the photometry result (Step 106) by the photometry sensor 46, and is set to 7H (H indicates one horizontal scanning period). The electric charge accumulating period of the second CCD 13 (for the R-component) is longer than that of the first CCD 12, and is set to 8H. The electric charge accumulating period of the third CCD 14 (for the B-component) is shorter than that of the first CCD 12, and is set to 6H. At time TR1, residual electric charge in the photodiodes 51 of the second CCD 13 is transferred to the vertical transfer CCD 54, and thus the electric charge accumulation of the R-signal is started. Then, at time TG1, i.e. when 1H has passed from the start of accumulating the R-signal, residual electric charge in the photodiodes 51 of the first CCD 12 is transferred to the vertical transfer CCD 54, and thus the electric charge accumulating for the G-signal is started.

At time TB1, i.e. when 1H has passed from the start of G-signal accumulation, residual electric charge in the photodiodes 51 of the third CCD 14 is transferred to the vertical transfer CCD 54, and thus electric charge accumulation of the B-signal is started. Namely, in each of the CCDs 12, 13 and 14, the accumulating of electric charge is started in sequence according to the length of the accumulating period, and the accumulating periods are varied only by discrete increments of one horizontal scanning period (H). At time T2, when 3H have elapsed from the start of the electric charge accumulation of the B-signal, residual electric charge remaining in the vertical transfer CCD 54 of each of the CCDs 12, 13 and 14 is simultaneously transferred to the smear drain 55, and discharged externally through the smear drain 55. This discharge operation is performed for 2H. At time T3, when 1H has passed from the end of the discharge operation, signal charges are transferred from the photodiodes 51 to the vertical transfer CCD 54 in each of the CCDs 12, 13 and 14, and thus, electric charge accumulating is stopped simultaneously.

At time T4, i.e., immediately after the electric charge accumulating periods have been stopped, the signal charge is transferred from the vertical transfer CCD 54 to the accumulating unit 53. After one field's worth of signal is transferred into the accumulating unit 53, the signal is read out at a predetermined time. Namely, the signal charge is outputted from the accumulating unit 53 externally through the horizontal transfer CCD 56. Note that the length of the vertical blanking period is about 20H, and the transfer of the signal charge to the accumulating unit 53 is completed during the vertical blanking period.

As described above, in the first embodiment, the effect as an adjustment in which the gain for each of the three primary colors (R, G, and B) is adjusted individually, is obtained by varying the electric charge accumulating periods in the CCDs 12, 13 and 14. The white balance adjustment has been performed when the image signals are read from CCDs 12, 13 and 14, and is not carried out by calculation in an analog circuit. Therefore, according to the first embodiment, since a white balance adjustment is performed by controlling and varying the accumulating period in CCDs 12, 13 and 14, errors do not occur due to signal deterioration normally associated with analog control circuits. Further, a white balance adjustment is performed with high accuracy.

Figure 7:
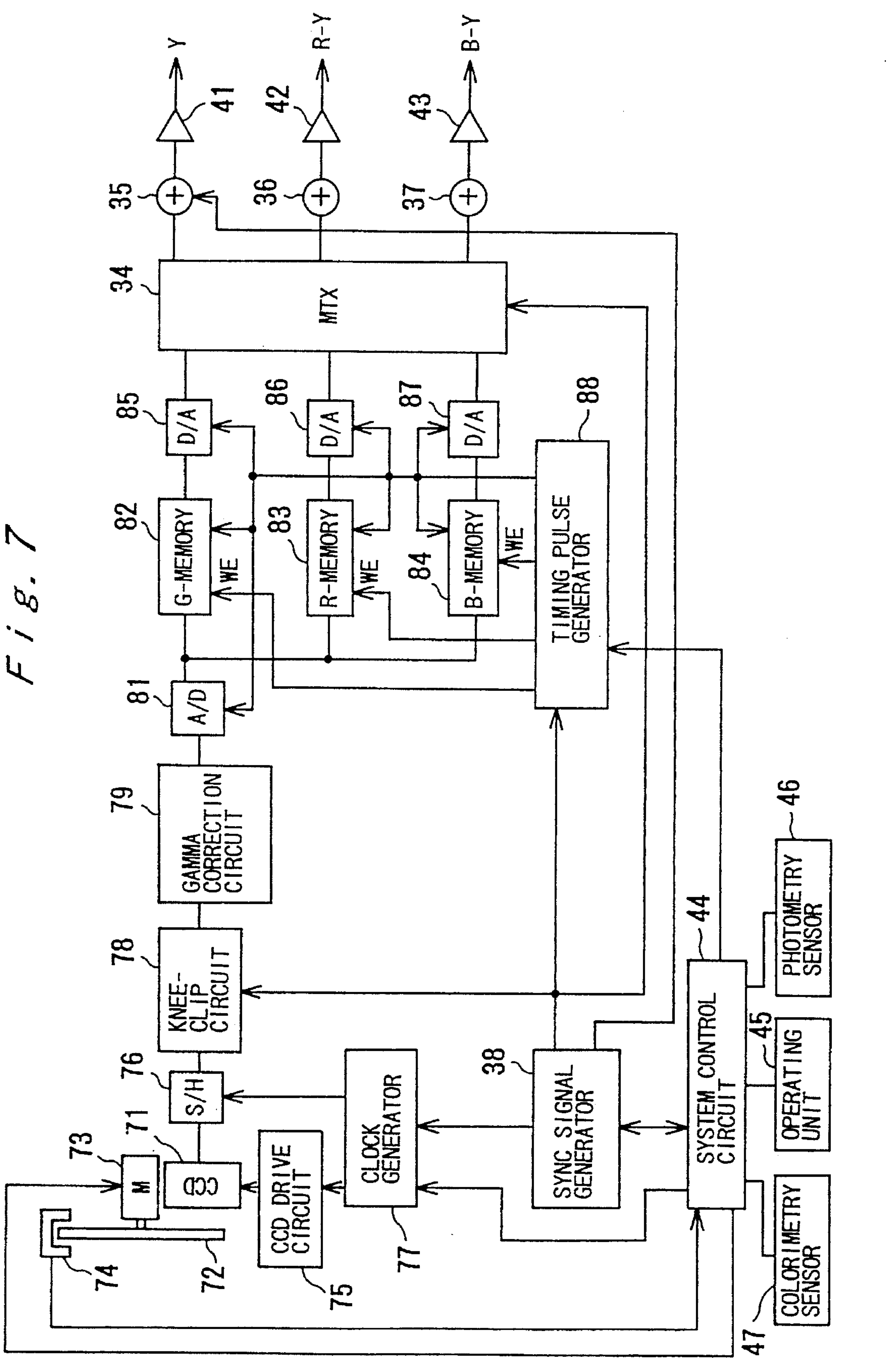
FIG. 7 is a block diagram of an electronic still video camera having a white balance adjusting device of a second embodiment.

FIG. 7 is a block diagram of an electronic still video camera having a white balance adjusting device of a second embodiment.

Figure 8:
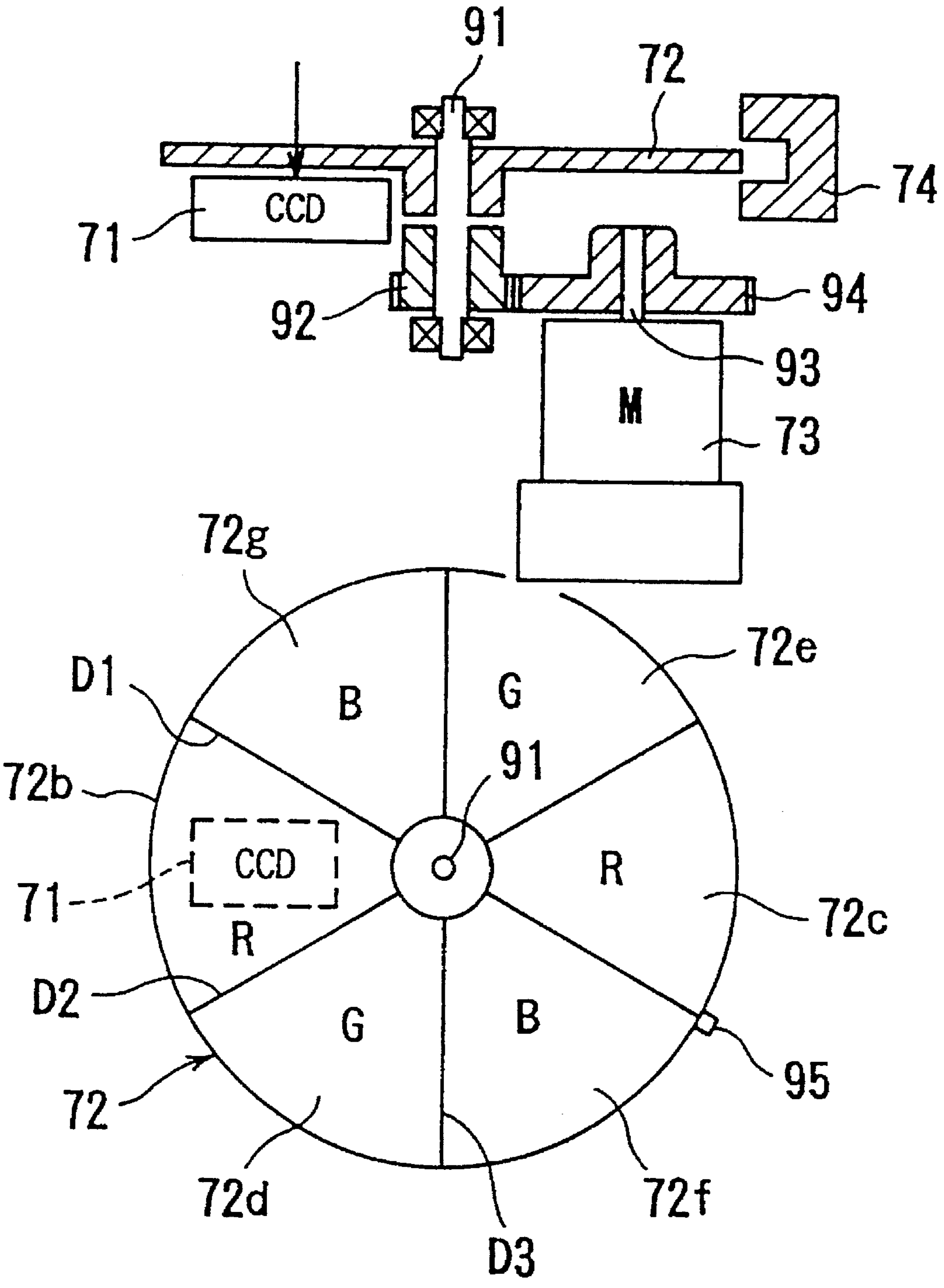
FIG. 8 is a sectional view showing a construction of a rotational color filter and members provided around the rotational color filter.
Figure 9A:
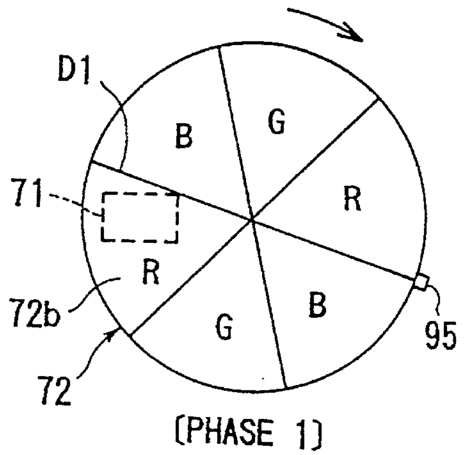
FIG. 9A through 9F are views showing a rotational phase of the rotational color filter.
Figure 9B:
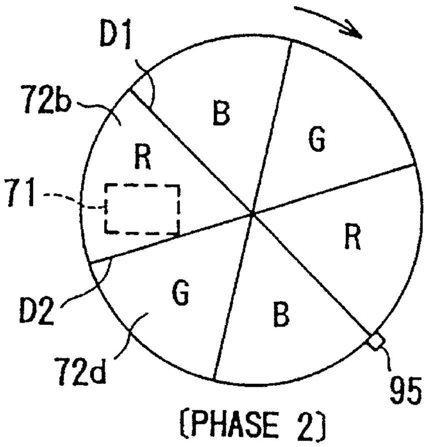
Figure 9C:
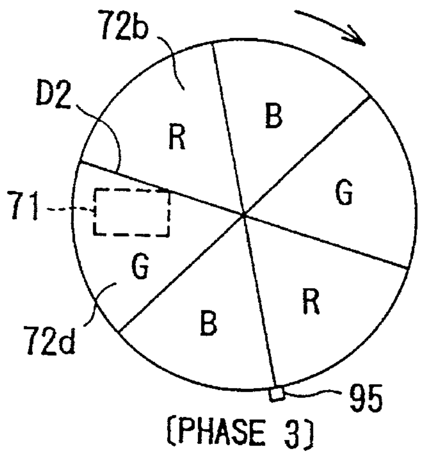
Figure 9D:
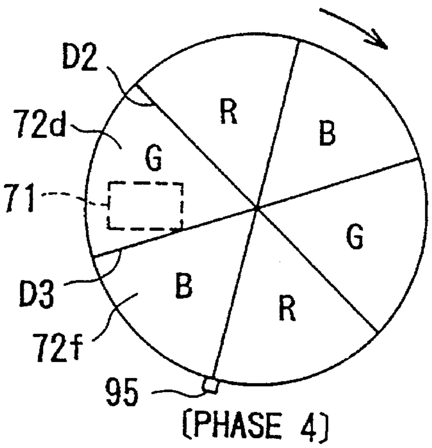
Figure 9E:
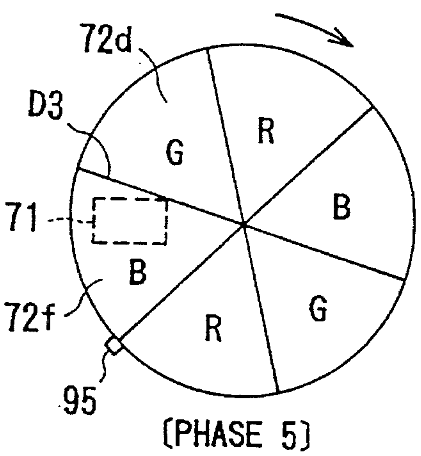
Figure 9F:
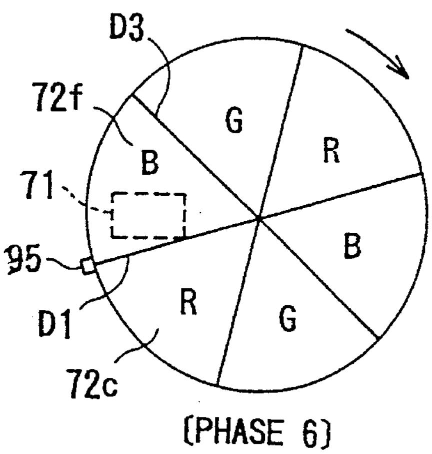

In this embodiment, a single CCD 71 is provided, and a color filter 72 is disposed in front of the light receiving surface of the CCD 71. As shown in FIG. 8, the color filter 72 has an R-, a G- and a B-filter element. The color filter 72 is rotatable about the central axis thereof, and is rotated by a stepping motor 73. A starting point sensor 74 is disposed close to a peripheral portion of the rotatable color filter 72. As shown in FIG. 8, a projection 95 is formed on a periphery of the rotatable color filter 72, and when the projection 95 comes near the starting point sensor 74, a starting point signal is outputted by the starting point sensor 74. The CCD 71 is controlled by a CCD drive circuit 75, so that an R-, a G- or a B-signal is outputted from the CCD 71 in accordance with the rotational position of the color filter 72. These R-, G- and B-signals are inputted into a sample and hold circuit 76, and thus, at a predetermined time, the R-, G- and B-signals are held at a constant level. The operations of the CCD drive circuit 75 and the sample and hold circuit 76 are controlled in accordance with a clock signal outputted from clock generator 77.

The G-, R- and B- signals outputted by the sample and hold circuit 76 are subjected to knee-clip processing in a knee-clip circuit 78, and are then subjected to processes such as gamma correction in a gamma correction circuit 79. Then, the G-, R- and B-signals are converted to digital signals. The digital G-, R- and B-signals are temporarily stored in G-, R- and B-memories 82, 83 and 84, respectively. These signals are read out from memories 82, 83 and 84, and are converted to analog signals by D/A converters 85, 86 and 87. Operations of the A/D converter 81 and the D/A converters 85, 86 and 87 are controlled in accordance with a clock signal we outputted by the timing pulse generator 88. Also, writing and reading operations in the memories 82, 83 and 84 are controlled in accordance with the clock signal.

The timing pulse generator 88 is operated in accordance with output signals of a synchronizing signal generator 38 and a system control circuit 44. The analog G, R and B-signals are subjected to a predetermined process in a matrix circuit 34, so that the luminance signal (Y) and the differential color signals (R-Y, B-Y) are obtained. The luminance signal is added to a composite synchronizing signal outputted from the synchronizing signal generator 38 in an adder 35, and amplified by an amplifier 41. Similarly, the differential color signals are added to the composite synchronizing signals in adders 36 and 37, and amplified by amplifiers 42 and 43, respectively.

Then, the luminance signal and the differential color signals are outputted to a monitor device (not shown). The knee-clip circuit 78 and the matrix circuit 34 are operated in accordance with a clock signal outputted from the synchronizing signal generator 38.

Operation of the synchronizing signal generator 38 is controlled by the system control circuit 44, and operations of the clock generator 77 are controlled by the synchronizing signal generator 38 and the system control circuit 44.

An operating unit 45, a photometry sensor 46 and a colorimetry sensor 47 are connected to the system control circuit 44, similar to the first embodiment. Rotation of the stepping motor 73 is controlled by a motor control circuit (not shown) provided in the system control circuit 44. The motor control circuit receives a starting point signal outputted from the starting point sensor 74, and a vertical synchronizing signal (V-SYNC) and a field signal (FLD) outputted from the synchronizing signal generator 38. A drive pulse is outputted from the motor control circuit in accordance with the starting point signal, the vertical synchronizing signal (V-SYNC) and the field signal (FLD), to rotate the stepping motor 73, so that the rotational phase and the rotational speed of the color filter 72 are controlled. The starting point signal, the vertical synchronizing signal (V-SYNC) and the field signal (FLD) are utilized in the system control circuit 44 to recognize a rotational phase of the color filter 72, control the CCD 71 and to control the memories 82, 83 and 84.

FIG. 8 shows a construction of the rotational color filter 72 and the members provided around the rotational color filter 72. The color filter 72 is disk-shaped, and divided by three straight dividing lines D1, D2 and D3 passing through the center thereof to form two R-filter elements **72*b* and 72*c*, two G-filter elements 72*d* and 72*e*, and two B-filter elements 72*f* and 72*g*. The color filter 72 is integrally fixed to a rotational shaft 91 which is rotatably supported by a stationary frame (not shown). A gear 92 is integrally fitted to the rotational shaft 91, and meshed with a gear 94 fixed to an output shaft 93 of the motor 73. Therefore, when the stepping motor 73 rotates, the color filter 72 is rotated via gears 94 and 92, and thus, the R-filter element 72*b*, the G-filter element 72*d*, the B-filter element 72*f*, the R-filter element 72*c*, the G-filter element 72*e* and the B-filter element 72*g* alternately face the CCD 71**.

FIG. 9 shows a rotational phase of the rotational color filter 72, which is rotated at a constant speed clockwise in the drawing. Phase 1 corresponds to the time when the first dividing line D1 has just passed over the CCD 71 so that the R-filter element **72*b* faces the CCD 71 (FIG. 9A). Phase 2 occurs when the rotational color filter 72 is further rotated from the start of phase 1 and the second dividing line D2 comes close to the CCD 71 (FIG. 9B). Phase 3 corresponds to the time when the second dividing line D2 has passed over the CCD 71 and the G-filter element 72*d* faces the CCD 71, after phase 2 (FIG. 9C). When the third dividing line D3 comes close to the CCD 71 after phase 3, phase 4 occurs (FIG. 9D). Phase 5 corresponds to the time when the third dividing line D3 has just passed over the CCD 71 so that the B-filter element 72*f* faces the CCD 71 (FIG. 9E). Phase 6 corresponds to the time when the first dividing line D1 comes close to the CCD 71, after phase 5 (FIG. 9**F).

Namely, the R-filter element **72*b* covers the light receiving surface of the CCD 71 between phase 1 and phase 2, the G-filter element 72*d* covers the light receiving surface of the CCD 71 between phase 3 and phase 4, and the B-filter element 72*f* covers the light receiving surface of the CCD 71 between phase 5 and phase 6**.

With reference to FIGS. 4, 9A through 9F and 10, the relationship between a reading operation of the image signal from the CCD 71 and a rotating operation of the color filter 72 will be described. Note that, in the second embodiment, an operation in which the image signal is read out from the CCD 71 is basically the same as that of the first embodiment shown in FIG. 4, and the program by which the still image is recorded is basically the same as that of the first embodiment shown in FIG. 5.

Figure 10:
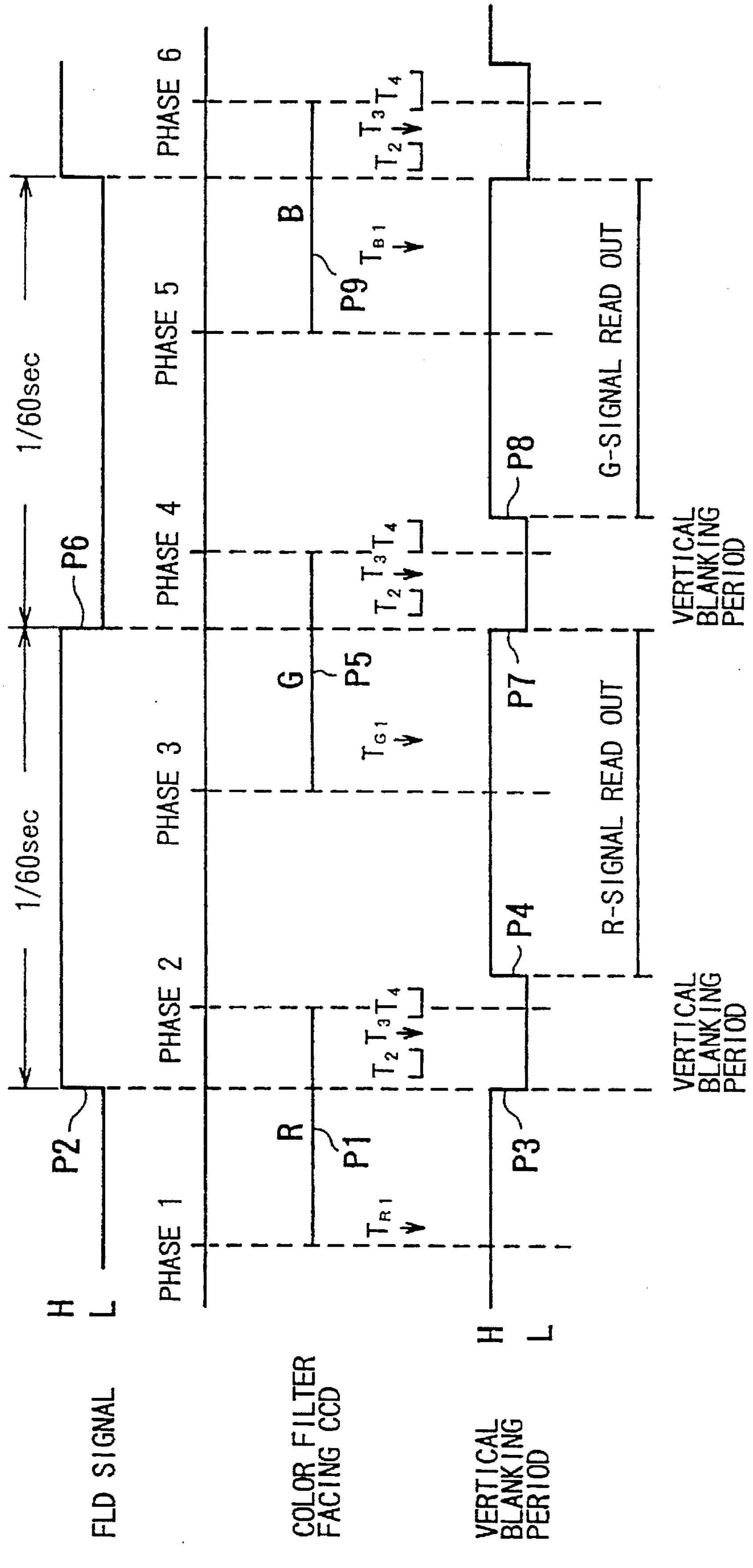
FIG. 10 is a diagram showing an operation in which the image signal is read out from a CCD in the second embodiment.

FIG. 10 shows an operation in which the image signal is read out from the CCD 71. In the example shown in FIG. 10, the accumulating period for the B-component is set to a relatively short time while the accumulating period for the R-component is set to a relatively long time, since the color temperature is relatively high. The rotational color filter 72 is always rotated at a constant speed under control of the motor control circuit. In this example, the rotational color filter 72 is rotated by one revolution every 1/10 sec.

Between phase 1 and phase 2, the R-filter element **72*b* faces the CCD 71 (reference P1). During this time, the residual electric charge in the photodiodes 51 is transferred to the vertical transfer CCD 54 at time TR1. Then, the FLD signal is changed from low (LO) to high (HI) (reference P2), and at the same time, the vertical blanking signal is changed from HI to LO (reference P3). During period where the vertical blanking signal is LO, the residual electric charge in the vertical transfer CCD 54 is discharged into the smear drain at time T2, and the effective electric charge (R-signal) accumulated in the photodiodes 51 is transferred into the vertical transfer CCD 54 at time T3. At phase 2, the dividing line D2 starts to pass over the CCD 71. Then, at time T4, the R-signal in the vertical transfer CCD 54 is transferred into the accumulating unit 53. This transfer operation is completed by the time when the vertical blanking signal is changed from LO to HI (reference P4). The R-signal transferred to the accumulating unit 53 is read out therefrom when the vertical blanking signal is HI. At phase 3, the CCD 71 is covered with the G-filter element 72*d* (reference P5). At time TG1, the residual electric charge in the photodiodes 51, which has been accumulated while the dividing line D2 is passing over the CCD 71, is transferred into the vertical transfer CCD 54. Then, the reading operation of the R-signal is completed, the FLD signal is changed from HI to LO (reference P6), and the vertical blanking signal is changed from HI to LO (reference P7). The residual electric charge in the vertical transfer CCD 54 is discharged into the smear drain 55 at time T2, and the effective electric charge (G-signal) accumulated in the photodiodes 51 is transferred into the vertical transfer CCD 54** at time T3.

At phase 4, the dividing line D3 starts to pass over the CCD 71. At time T4, the G-signal in the vertical transfer CCD 54 is transferred into the accumulating unit 53. The G-signal is read out from the accumulating unit 53 during the period where the vertical blanking signal is HI (after this signal is changed from LO to HI at reference P8). Similar to the above, the B-signal is detected. Namely, at phase 5, the CCD 71 is covered with the B-filter element **72*f* (reference P9), and at time TB1, the residual electric charge in the photodiodes 51 is transferred into the vertical transfer CCD 54. Then, the residual electric charge in the vertical transfer CCD 54 is discharged into the smear drain 55 at time T2, and the effective electric charge (B-signal) accumulated in the photodiodes 51 is transferred into the vertical transfer CCD 54** at time T3.

At phase 6, the dividing line D1 starts to pass over the CCD 71, and the B-signal is read out from the accumulating unit 53 while the vertical blanking signal is HI.

In the accumulating periods for generating the R-, G- and the B-signal, shown in FIG. 10, the accumulating period for the R-signal is the longest, and the accumulating period for the B-signal is the shortest, according to the colorimetry result. The start of electric charge accumulation is relatively early in the case of the R-signal and relatively late in the case of the B-signal, when the beginning of the vertical blanking period is set to the reference time. Further, the electric charge accumulation is stopped simultaneously in the case of each of the signals. Thus, in the second embodiment, the color filter 72 rotates at a constant rotational speed establishing predetermined periods commencing periodically, and during each of the predetermined periods, the start of electric charge accumulation is changed in accordance with the length of the accumulating period, and is stopped simultaneously for each of the image signals.

As described above, in the second embodiment, the white balance adjusting device is constructed in such a manner that the same effect as the gain for each of the R, G and B primary color components being adjusted, is obtained by controlling the electric charge accumulation of the CCD 71 while each of the color filter elements 72*b* through 72*g* faces the CCD 71. Therefore, also according to the second embodiment, since a white balance adjustment is performed by controlling and varying the accumulating period in CCDs 12, 13 and 14, errors do not occur due to signal deterioration normally associated with analog control circuits. Further, a white balance adjustment is performed with high accuracy.

Although the embodiments of the present invention have been described herein with reference to the accompanying drawings, it is obvious that many modifications and changes may be made by those skilled in the art without departing from the scope of the invention.

The present disclosure relates to subject matter contained in Japanese Patent Application No. 6-67682 (filed on Mar. 11, 1994) which is expressly incorporated herein, by reference, in their entirety.

I claim:

1. A white balance adjusting device provided in an electronic still video camera, comprising:

a colorimetry sensor, said colorimetry sensor sensing a color temperature of an object to be photographed by said electronic still video camera;

means for generating image signals indicating three primary colors of light reflected from said object, said generating means accumulating electric charge in photodiodes during a charge accumulating period associated with each of said three primary colors; and a control circuit controlling said charge accumulating period for each of said three primary colors, based on said color temperature sensed by said colorimetry sensor.

2. A white balance adjusting device according to claim 1, wherein said generating means includes a first imaging device for sensing a green-component of said object, a second imaging device for sensing a red-component of said object, and a third imaging device for sensing a blue-component of said object.

3. A white balance adjusting device according to claim 2, wherein said control circuit changes a first ratio of said accumulating periods in said second imaging device to said first imaging device, and a second ratio of said accumulating periods in said third imaging device to said first imaging device.

4. A white balance adjusting device according to claim 2, wherein said control circuit initiates accumulating the electric charge in each of said imaging devices in sequence according to the length of said charge accumulating period, and the electric charge accumulated in each of said imaging devices is stopped simultaneously.

5. A white balance adjusting device according to claim 1, wherein said accumulating periods are varied by discrete increments of one horizontal scanning period.

6. A white balance adjusting device according to claim 1, further comprising an optical member through which the light reflected from said object is divided into three primary color components.

7. A white balance adjusting device according to claim 1, wherein said generating means includes one imaging device and a color filter having a red-filter element, a green-filter element and a blue-filter element, said color filter being rotatably provided in front of said imaging device so that one of said filter elements faces said imaging device.

8. A white balance adjusting device according to claim 7, wherein said color filter is disk-shaped, and is divided into two red-filter elements, two green-filter elements and two blue-filter elements, by three straight lines passing through the center of said color filter.

9. A white balance adjusting device according to claim 7, wherein said color filter rotates at a constant rotational speed to establish predetermined periods commencing periodically, and during each of said predetermined periods, the start of electric charge accumulation is varied in accordance with the length of said charge accumulating period, and the electric charge accumulation is stopped simultaneously for each of said image signals.

10. A white balance adjusting device according to claim 1, further comprising means for performing a photometry measurement, said control circuit determining said charge accumulating period for a green-component based on said photometry measurement, said control circuit further controlling said charge accumulating period for each of said red-component and a blue-component based on said accumulating period for said green-component and said color temperature sensed by said colorimetry sensor.

11. A white balance adjusting device provided in an electronic still video camera, comprising:

a colorimetry sensor sensing a color temperature of an object to be photographed by said electronic still video camera;

means for generating image signals of said object by accumulating electric charge in a photodiode, said image signals indicating three primary colors, an accumulating period during which electric charges are accumulated to generate each of said image signals being adjustable; and a control circuit controlling said accumulating period for each of the three primary colors, based on said color temperature sensed by said colorimetry sensor.

12. A white balance adjusting device provided in an electronic still video camera, comprising;

means for sensing a color temperature of an object to be photographed by said electronic still video camera;

means for generating respective image signals indicating three primary colors of said object by accumulating electric charge in photodiodes, during respective accumulating periods for each of said three primary colors; and means for controlling said respective accumulating periods for each of said three primary colors, based on said color temperature sensed by said means for sensing.

* * * * *